United States Patent [19]

Jurgenlohmann et al.

[11] Patent Number: 4,724,108

[45] Date of Patent: Feb. 9, 1988

[54] METHOD FOR THE INSTALLATION OF PLASTIC PIPES IN SEWAGE PIPING

[75] Inventors: Peter Jurgenlohmann, Gutersloh; Gunter Schroder, Bad Schwartau, both of Fed. Rep. of Germany

[73] Assignee: Wiik & Hoglund GmbH, Lubeck, Fed. Rep. of Germany

[21] Appl. No.: 721,323

[22] Filed: Apr. 9, 1985

[30] Foreign Application Priority Data

Apr. 9, 1984 [DE] Fed. Rep. of Germany ....... 3413294

[51] Int. Cl.⁴ .................. E04B 1/16; F16L 55/18; B29C 39/10; B29C 65/00
[52] U.S. Cl. ........................... 264/35; 264/31; 264/36; 264/40.1; 264/269; 138/97; 138/98; 29/431; 405/154; 405/156; 156/64; 156/94; 156/304.2
[58] Field of Search ............. 264/31, 35, 36, 269; 156/64, 94, 304.2; 29/431; 138/97, 98; 405/154, 156

[56] References Cited

U.S. PATENT DOCUMENTS 4,245,970 1/1981 St. Onge ..................... 138/97 X
4,496,499 1/1985 Brittain et al. ............... 264/269 X

FOREIGN PATENT DOCUMENTS 110664 6/1984 European Pat. Off. .......... 138/97
611994 6/1979 Switzerland ................. 138/97

OTHER PUBLICATIONS

H. S. St. Onge, "Updating Aging Sewers Without Trenching", *Engineering and Contract Record*, 7–1974.
"Sewer Renewal by Insertion with Nipak Polyethylene Pipe", 5-9-73.

*Primary Examiner*—Jan H. Silbaugh
*Assistant Examiner*—Neil M. McCarthy
*Attorney, Agent, or Firm*—Zarley, McKee, Thomte, Voorhees & Sease

[57] ABSTRACT

In the procedure for the installation of plastic pipe pieces with lateral branch openings into sewage pipes to be repaired, the first step is the measuring in the longitudinal axial direction of the branch of the sewage pipe from the inside with respect to the already installed piece of plastic pipe. After that, a lateral opening is formed in the plastic pipe while the pipe is above ground and outside of the sewage pipe. Next, the already prepared plastic pipe is joined in an aligned position with the already installed plastic pipe, with the help of a movable transporter inside the sewage pipe.

3 Claims, 7 Drawing Figures

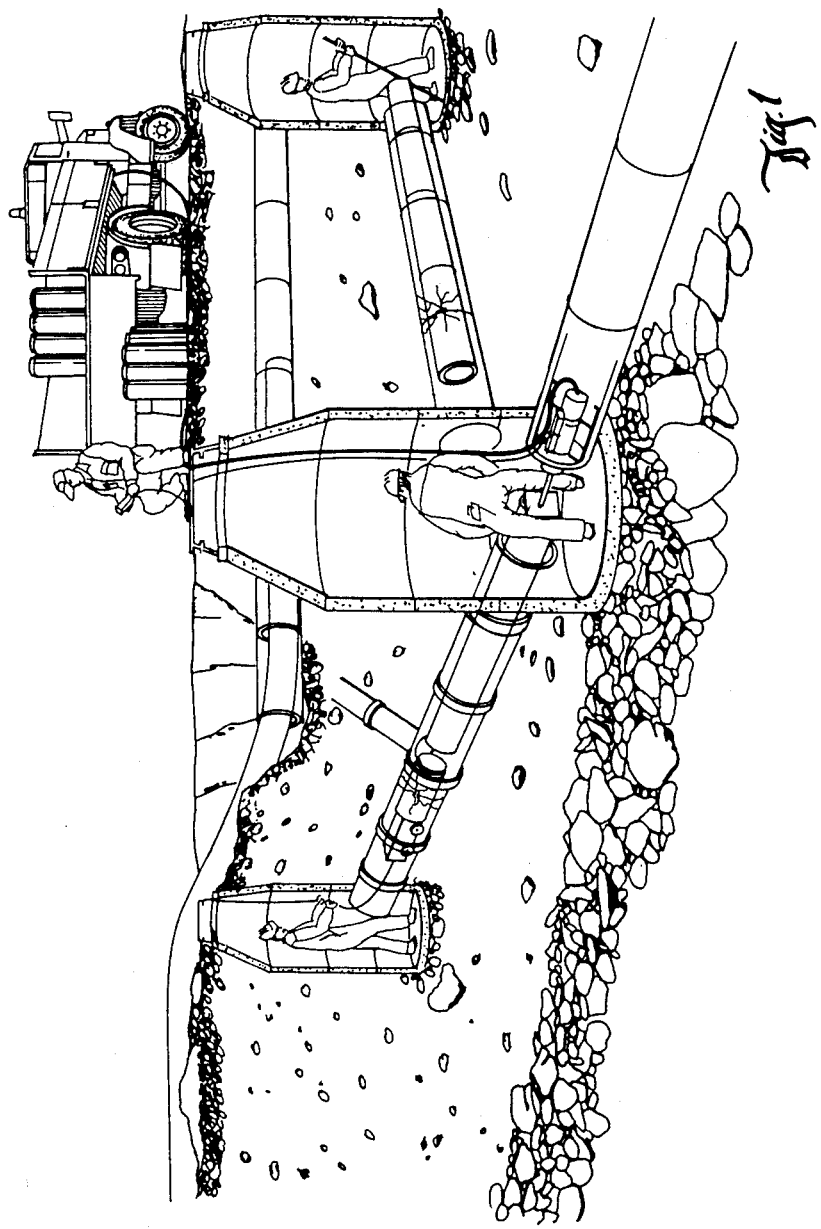

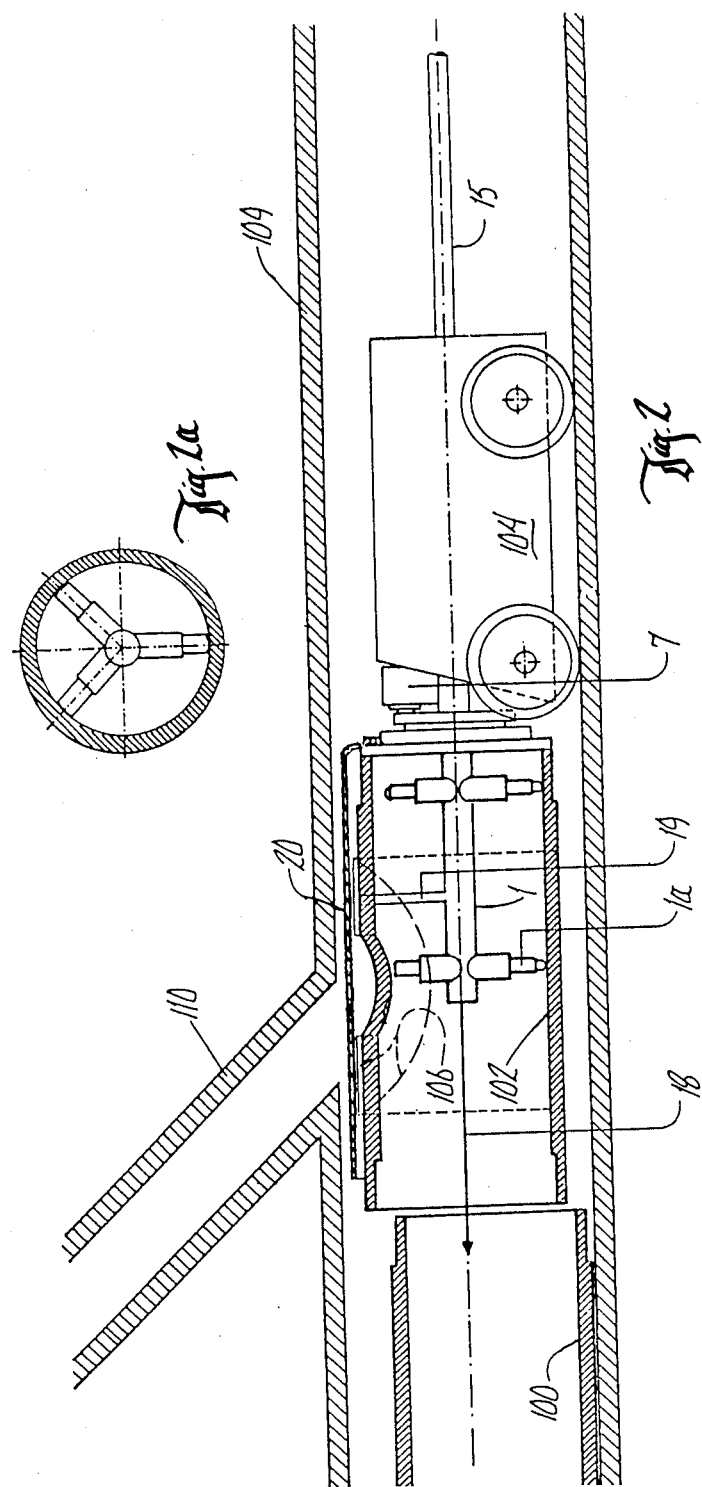

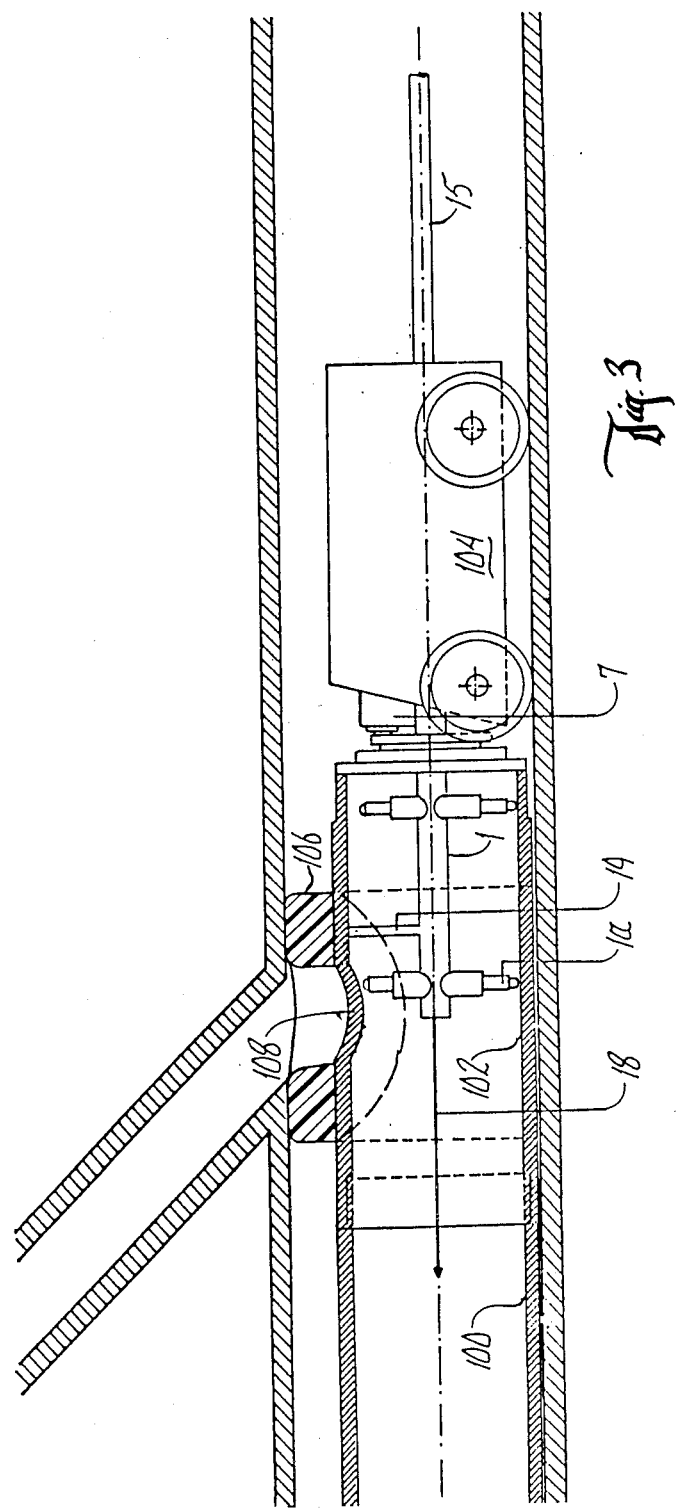

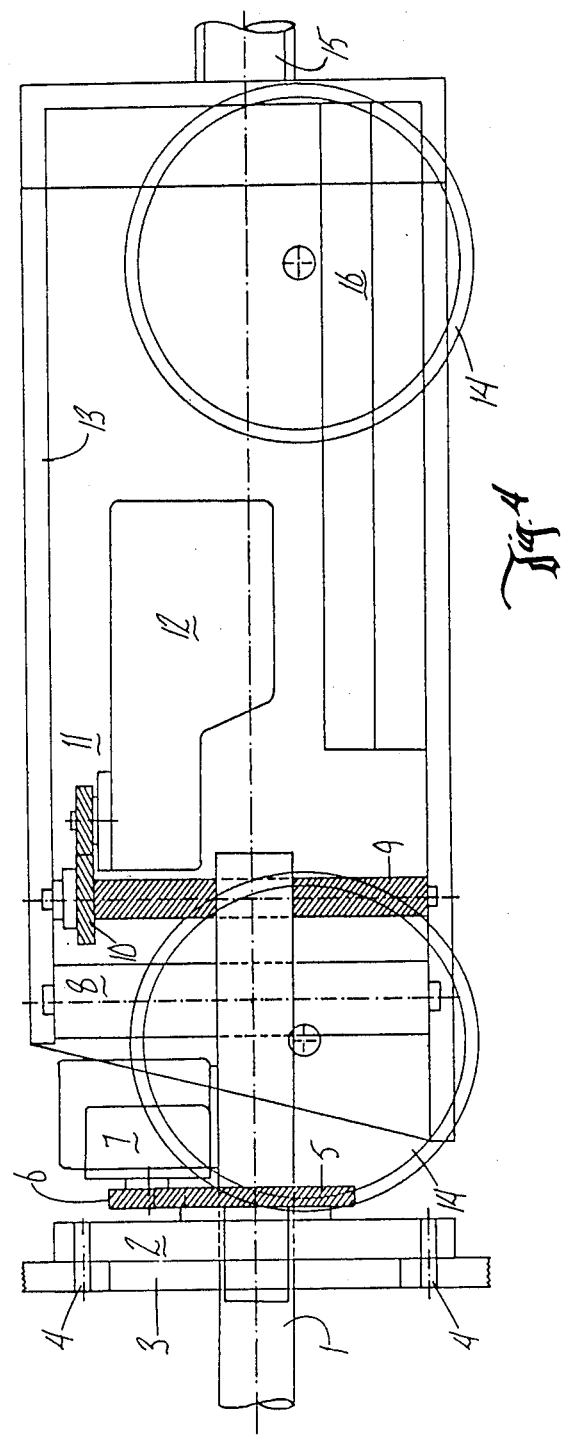

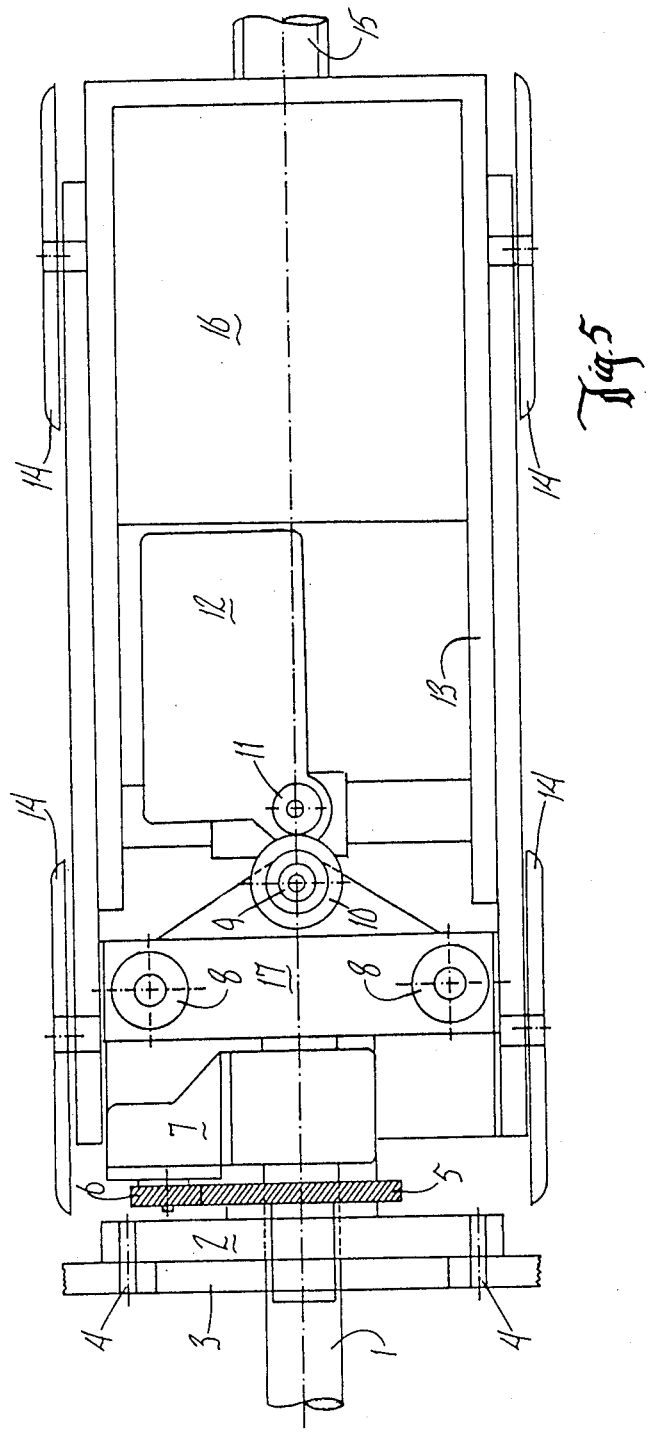

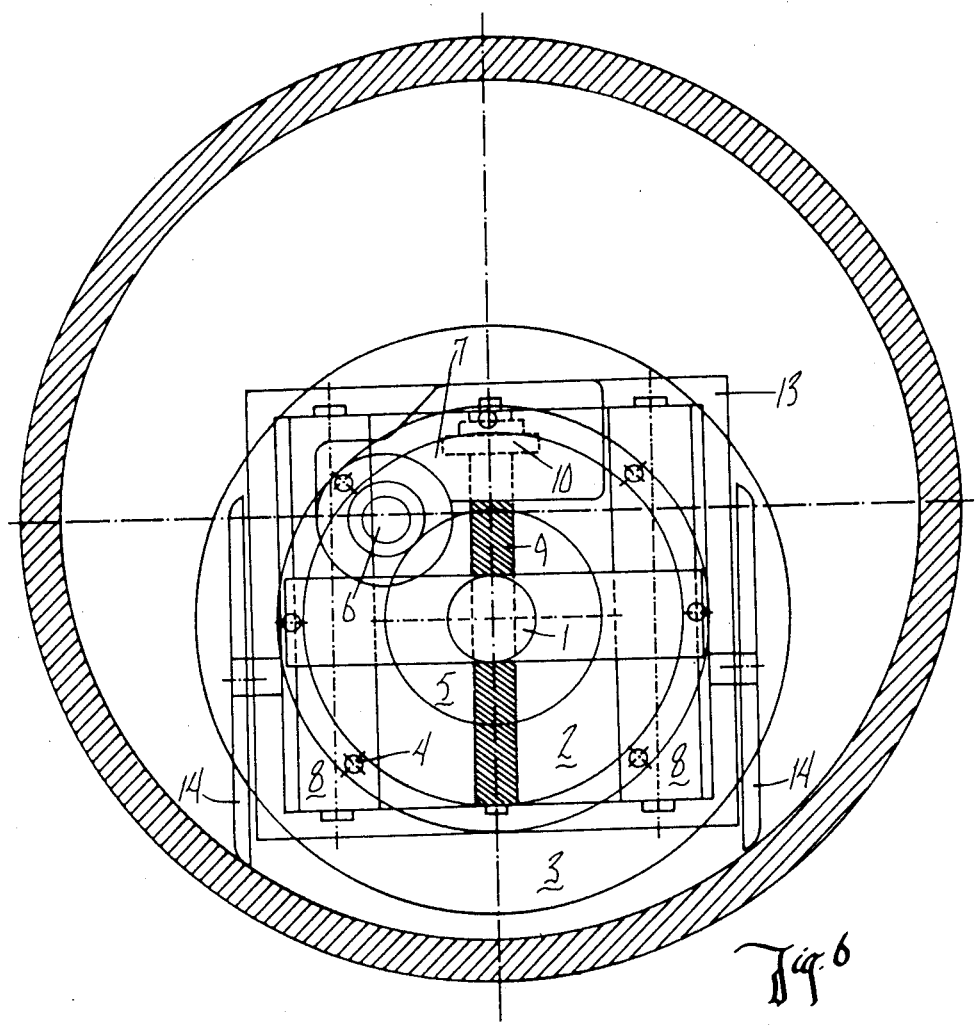

METHOD FOR THE INSTALLATION OF PLASTIC PIPES IN SEWAGE PIPING

The invention relates to the procedure for installation of plastic pipes with lateral openings in sewage pipes to be repaired which have lateral openings, as well as the apparatus to execute this method.

The insertion of short pipes into sewage pipes that are to be repaired does not pose any problems wherever a straight portion, without lateral branches has to be repaired. In this case the repair can be undertaken without exterior digging, from the main channel shafts.

The repair becomes problematic in places of the water pipes that present lateral branches as in cases of house connections. In order to connect these house pipes with the plastic pipe located inside, it is necessary to have a lateral opening in the pipe. It is common to make these openings either by milling or by high pressure steel cutters, or by digging close to the connection and making the opening from outside. The digging of the connection site is the most complicated and expensive method. The other two mentioned methods are not without complications. It is particularly difficult to fit the milling installations in smaller pipes so that the hole will be drilled in the right place and angle of the pipe. While opening a hole from inside, it is problematic to find the exact location of the lateral branches after the pipe without opening is already in the sewer pipe to be repaired, covering the conncetion hole from inside.

To avoid this problem, it has been suggested to drill the connection hole into the plastic pipe from outside, that is through the house connection channel. This is problematic, because usually house connection pipes have elbows, through which it is impossible to transport the necessary cutting devices. Apart from that, this method is very difficult, because house connection pipes usually have a particularly small diameter, sometimes even under 150 mm.

Seen from this technical point, the invention has the purpose to create a method and procedure of the before mentioned kind, which will avoid the drawbacks of the known methods, and allow a quick and correct insertion of a plastic pipe piece with a prepared lateral opening.

The solution to this problem is contained in the characteristics of claim 1.

With the invented method, there is first a rough measuring of the different lateral branches by means of a television camera. The different lateral branch sites are drawn into a diagram, and a more accurate measuring is done, whenever the last complete piece of pipe has reached the vicinity of the next lateral branch opening. This is the case, when the next plastic pipe to be inserted would cover the branch site. An exact measurement of the branch site in an axial direction is done, and the short pipe that is to be moved to the branch site is provided with the exact fitting openings in the exactly determined place in the direction of the longitudinal axis. This can be done by any method, such as milling.

The so prepared plastic pipe, with the exactly determined opening in the longitudinal direction of the channel, has to be connected now with the preceding pipe. This ensues with the help of a transport device inside of the sewage pipe, which is rolled in from the unrepaired part of the channel. This transport device is either self propelled or activated by a tow rope or thrust pole. It is then advanced carrying with it the plastic pipe piece with the lateral opening.

For this purpose, the transporter has a retaining arm, which holds the plastic piece from its inside. In order to avoid scraping the plastic pipe against the inner walls of the sewage pipe to be repaired, it is lifted or lowered into the right position. As soon as the new plastic pipe is close to the already installed plastic pipe, it is lowered until it aligned with the other already installed plastic pipe. Through an inside movable television camera, the correct orientation of the openings with respect to the lateral branch openings are again checked. If there is a difference, the plastic pipe is turned through a motor impulse in the transporter, so that the connection opening and the lateral branch opening are exactly aligned. The plastic pipe with the opening is then pushed or inserted into the already installed new pipe, in this twisted and aligned position.

A method like this is quick and reliable. It allows a quick installation of branch openings in the plastic pipes on the surface, and an exact placing underground, without underground work.

It has proven useful to surround the lateral opening of the plastic pipe from the outer side of the plastic pipe with a expandable cuff, which expands after the lined up insertion, thus forming a circular seal which fills out the gap between the outer side of the plastic pipe and the inner side of the sewage pipe in the area next to the opening.

Preferably the cuff is filled with plastic. This kind of isolation is particularly simple and reliable.

Particular elaborations on the invention are described under sub claims. Following is a description of the preferred procedure for the application of the method, in a systematic way, with the help of diagrams.

FIG. 1 is a schematic view of a building site for the repair of sewage pipes with short plastic pipe pieces.

FIG. 2 is a longitudinal section through the branch site with transporter and plastic pipe pieces.

FIG. 2a is a sectional view of pipe 102 as viewed from the left end thereof.

FIG. 3 is a view similar to FIG. 2, but showing aligned pipe pieces and the expanded cuff.

FIG. 4 is a schematic side view of the transportation device.

FIG. 5 is a schematic top view of the transportation device.

FIG. 6 is a schematic front view of the transportation device without a piece of pipe in the sewage pipe to be repaired.

The sewage pipe 108 to be repaired has a connection or branch 110. The already installed plastic pipe piece 100 ends close to the branch 110. The transportation device 104, which in the illustrated example moves on wheels, has the support 1 with several radial extending arms 1a, which grab the piece of plastic pipe 102 to be installed firmly from inside. The axis of the support 102 extends parallel to the sewer pipe axis. The transportation device 104 is either moved with a a, thrust pole 15 or with a tow rope is together with the aligned plastic pipe piece 102 in the direction of the axis.

The support 1 for the plastic pipe 102 to be installed can be turned by a first motor 7 and through another motor 12 moved transversaly to the pipe axis. More details regarding these motors are given in connection with FIGS. 4 to 6.

The branch opening 108 of the plastic pipe piece to be installed is surrounded by a first flat cuff 106. This cuff is usually covered by a protective hood 20 (FIG. 2), which ensures, that the cuff will not be mechanically damaged during the transportation through the sewage pipe.

In the procedure according to FIG. 3 a protective hood 20 is not contemplated.

After the exact alignement of the opening 108 towards the lateral branch 110, the plastic pipe piece 102 is pushed onto the end of the already installed plastic pipe piece 100. After that, the cuff 106 is filled through a filling pipe 19 with plastic or any other filling material. The expandable cuff D fills out the area surrounding the branch opening between the plastic pipe 102 and the sewage pipe 109 to be repaired. This ensures, that no sewage water can touch the outer side of the plastic pipe.

In FIGS. 4 to 6 the transportation device designated 104 is described in more detail. In this figure, there is only the center piece of the support 1 visible.

The support 1 has a frontal plate 2, to which interchangeable stop plates 4 can be screwed on with the help of 4 screws. Different diameters in the stop plates 3 are necessary for different plastic pipe diameters.

Plate 2 is attached to the transportation device 104 through a turnable central axis. Parallel to the axis of plate 2 is a gear wheel 5, connected to a driving wheel 6. The driving wheel 6 is powered by an electric motor 7, which can turn in both directions. With this motor 7 the turning of the plastic pipe to be installed can be done by remote control.

The motor 7 and the support with turn drive are attached to a guide spreader 17, which are movable on parallel guides 8. Parallel to the guides 8 there is a spindle 9, which is connected to the guide spreader 17 through a spindle nut. On the upper end of the spindle 9, there is a gear wheel 10 permanently attached to the spindle. The gear wheel 10 is connected with the power wheel 11 of a second motor 12.

The motor 12 can turn in both directions. This causes the respective turning of the spindle and with it the lifting or lowering of the guide spreader. This way, the plastic pipe described in FIG. 1 is moved upwardly and downwardly respectively.

The numeral 14 designates the wheels of the transportation device. Instead of wheels, skids can also be used. The back end of the transportation device 104 shows a thrust pole 15, which—like the alternative tow rope 8 in FIGS. 2 and 3, can be used to propell the transportation mechanism.

In the thrust pole 15 are also contained the different supply lines, among others the supply line that will enable to convey plastic through the filling line 19, into the inside of the cuff 106.

The numeral 16 designates ballast, which ensures that the transportation device doesn't flip over under the weight of the plastic pipe and the support.

The numeral 20 designates the protective hood to cover the cuff 106. When a protective hood is contemplated—as in the method shown in FIG. 2—the transportation device has to be rolled back, after pulling in the arms 1a to the right, before the expansion of the cuff 106 can be undertaken. In this type of construction a different kind of filling line as the one shown in FIGS. 2 and 3, is needed—for instance, a flexible filling line.

I claim:

1. A method for repair of a sewage pipe having a plurality of lateral branch openings positioned along the axial length of said sewage pipe, said method comprising:
    installing a first plastic pipe piece within said sewage pipe; measuring the axial distance from said first plastic pipe piece to one of said lateral branch openings in said sewage pipe; cutting a lateral opening in a second plastic pipe piece while said second plastic pipe piece is positioned outside said sewage pipe, the location of said second pipe piece lateral opening being determined by said measured axial distance; installing said second plastic pipe piece in said sewage pipe and joining said second plastic pipe piece to said first plastic pipe piece with said lateral opening of said second pipe piece being in registered alignment with said one lateral branch opening of said sewage pipe; said installation of said second plastic pipe piece being accomplished by means of a transportation device capable of manipulating said plastic pipe pieces.

2. A method according to claim 1 comprising: encircling said lateral opening of said second plastic pipe piece with an expandable cuff, expanding said cuff after aligned installation whereby to form a circular seal closing a gap between the outer surface of said plastic pipe piece and the inner surface of said sewage pipe surrounding said sewage pipe lateral opening.

3. A method according to claim 2 in which said expandable cuff is expanded by filling it with plastic material.

* * * * *